INVENTORS.
WILLIAM C. ELMORE
DENNISON BANCROFT
BY NICHOLAS MAROPIS
CARMINE F. DePRISCO

Arthur H. Seidel
ATTORNEY

Nov. 29, 1966   D. BANCROFT ETAL   3,288,241
METHOD AND APPARATUS FOR MEASUREMENT OF ACOUSTIC POWER
TRANSMISSION AND IMPEDANCE
Filed Nov. 1, 1960   3 Sheets-Sheet 2

INVENTORS.
WILLIAM C. ELMORE
DENNISON BANCROFT
BY NICHOLAS MAROPIS
CARMINE F. DePRISCO

Arthur H. Seidel
ATTORNEY.

INVENTORS.
WILLIAM C. ELMORE
DENNISON BANCROFT
BY NICHOLAS MAROPIS
CARMINE F. DePRISCO

Arthur H. Seidel
ATTORNEY.

United States Patent Office 3,288,241
Patented Nov. 29, 1966

3,288,241
METHOD AND APPARATUS FOR MEASUREMENT OF ACOUSTIC POWER TRANSMISSION AND IMPEDANCE
Dennison Bancroft, Waterville, Maine, and Nicholas Maropis, West Chester, Carmine F. De Prisco, Glen Mills, and William C. Elmore, Swarthmore, Pa., assignors to Aeroprojects Incorporated, West Chester, Pa., a corporation of Pennsylvania
Filed Nov. 1, 1960, Ser. No. 66,642
20 Claims. (Cl. 181—.5)

This invention relates to a method and apparatus for measuring acoustic power transmission and/or impedance, and more particularly to the measurement of ultrasonic power transmission and/or impedance.

Acoustic power transmission is or should be a matter of interest to both the manufacturer and user of ultrasonic equipment, but quantitative determinations of such power are not a simple matter and the problem has been engaging the attention of workers in the art for many years. Thus, with increasing production and industrial plant use of this type of equipment, it is of vital concern that units be provided having identical characteristics including acoustic power transmission. Measurement of the electrical power input to the transducer which converts alternating electrical current into mechanical vibration is relatively straightforward. While the conversion efficiency of the transducer itself may be rather accurately ascertained (usually by electrical methods, such as measuring impedance circles of unloaded and loaded transducers), factors introduced by energy-absorbing or other loss sources (including the coupling system, the mounting system, joints between parts, the work, etc.) in a particular unit and process tend to complicate matters. Thus, while power input may be more or less readily determined, useful acoustic power output may not.

So far as is known, no practical method for measuring transmitted ultrasonic power has gained general acceptance, although several methods have been suggested, most of these being concerned with ultrasonics in applications involving liquids, in the presence or absence of cavitation as the case may be, and all being indirect methods.

Thus, one can indirectly determine power delivered to an extended medium by measurement of the so-called "radiation pressure" developed upon a disk or loudspeaker. Or it may be possible to absorb all the acoustic power by converting it into heat, and from the rate of heating of a suitable device to infer the rate at which energy is delivered. More frequently, the electrical power delivered to an electromechanical transducer is measured, and the acoustic power developed by the transducer-coupling system is estimated from a knowledge of the efficiency of the transducer and certain characteristics of the coupling system. These methods, and the apparatus associated with them, are cumbersome, difficult to calibrate, and time-consuming to apply to any wide variety of problems.

It is well known that criteria for transmission of acoustic power through a mechanical system may be concisely expressed in terms of acoustic impedance, which may be defined as the ratio of force at any point to the corresponding or concomitant particle velocity. An analogy then exists between the various acoustic parameters and their electrical equivalents or counterparts. Determination of the acoustic impedance terminating a coupler which transmits vibrations from the transducer to the work is highly desirable for purposes of a more complete understanding and control of ultrasonic phenomena and being able to build more efficient equipment. Ultrasonic welding is one of many ultrasonic applications where this information is of considerable value. Unfortunately, the direct experimental measurement of acoustic impedance is not simple. The acoustic analogue of Wheatstone's bridge, for example, while conceptually feasible, presents formidable difficulties because of the difficulty of making reproducible low-impedance joints between members of the transducer-coupling system. Heretofore, persons skilled in the art, when attempting to establish the impedance of the load in unknown systems, have resorted to substitution schemes wherein the transducer-coupling was loaded artificially and the effect on the driving impedance observed (usually from the electrical side). After a number of such observations, one can deduce the load impedance if it is essentially constant and not overly reactive. The present invention is vastly superior for the purpose.

In addition, indication by proper instrumentation of either the power being delivered or the impedance at any instant would have great utility in connection with insuring operation of ultrasonic equipment at its maximum efficiency. Thus, while tuning of the equipment to resonance (e.g., the adjustment of the frequency of the power source so that it exactly matches the mechanical resonance frequency of the transducer-coupling system) is not essential in all applications, small deviations from precise tuning are important in situations requiring maximum equipment performance for quality work or economic reasons. Persons skilled in the art can, of course, adjust or "tune" to resonance quite accurately with a plate current meter or observing the dip or by use of a tuning eye, but the present invention is more accurate than either of these.

This invention has as an object the provision of a novel method of determining the acoustic power transmitted by an acoustical coupler.

This invention has as another object the provision of apparatus for determining instantaneous values of transmitted acoustical power.

This invention has as yet another object the provision of method and apparatus for determining the acoustical impedance presented to a transducer-coupling system by a load.

This invention has as a further object the provision of basic instrumentation for measuring acoustic power being delivered or determining the load impedance at any instant.

This invention has as yet a further object the provision of a method whereby the mechanical standing wave ratio existing on a mechanical coupler or ultrasonic mechanical transmission line can be accurately determined.

This invention has as a still further object the provision of a tool that can be easily inserted into any transmission line to determine the mechanical standing wave ratio, the instantaneous and/or average mechanical power being delivered, and the impedance terminating the mechanical transmission line.

Other objects will appear hereinafter.

For the purpose of illustrating the invention there is shown in the drawings a form which is presently preferred, it being understood, however, that this invention is not limited to the precise arrangements and instrumentalities shown.

Referring to the drawings wherein like reference characters refer to like parts:

Figure 1:
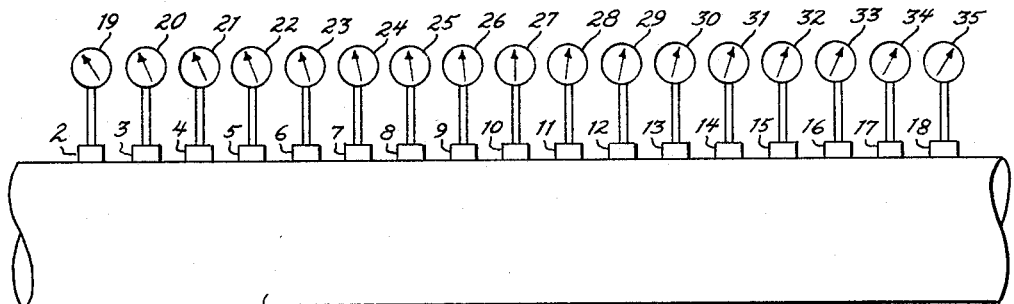
FIGURE 1 shows a schematic view of the apparatus for determining the standing wave pattern in a bar capable of transmitting acoustic power regardless of the mode of vibration.

According to the present invention, average acoustical power may be determined by observation, with or without suitable recording devices, of oscillatory standing-wave cycles. This determination is of value in a study of such processes as ultrasonic welding, where a relatively small number of cycles may be of critical significance. For longer intervals of time, mere reading of a meter may suffice to obtain acoustic power measurements. Whereas devices for measuring electrical power transmitted are based on measurements of the average amplitude (but ordinarily not the phase) of the alternating potential at two or more points along the electrical transmission line, the method and apparatus of the present invention are based on measurements of the instantaneous alternating particle displacement, particle velocity, or particle acceleration at two or more points along a structural member which may be described as an acoustical transmission line or "coupler." In general, measurements of alternating mechanical displacement in accordance with this invention may be accomplished by means of small electromechanical transducers, the alternating electrical output of which is proportional to the alternating displacement of the particle to which the transducers are attached. Once the appropriate electrical signals have been obtained, the magnitude of the average acoustical power in terms of these signals may be ascertained.

A simplified explanation of the present invention is as follows:

When a single elastic wave traverses a coupling member, the phenomenon, if it could be enlarged and observed, would appear as a progressing compression wave which moved from the source to the terminal end of the coupling member, where it presumably was emitted into the surrounding environment. Due to the elastic properties of materials, a simple compression wave is not possible. Instead, this simple single elastic wave would also produce a very slightly enlarged or expanded zone in the coupling member, approximately together with the compression wave (which would travel down the coupling member, approximately together with the compression wave), which would travel down the coupling member on the outside and would, in fact, resemble a single peristaltic wave. Thus, if a single microphone element were attached to the outside surface of a coupling member which conducted a single elastic wave from a source at one end to the other end of the member where it was radiated, the microphone element would "see" an amplitude displacement in accordance with FIGURE 5.

Each material has a characteristic speed at which it will conduct an elastic wave. This may be referred to as the speed of sound in the material. See Ultrasonic Engineering by A. E. Crawford (New York: Academic Press, Inc., 1955), pages 6–9. Thus, a traversing wave in any particular material travels essentially at a fixed speed. The amplitude displacement may be a little out of phase with the compression wave.

The microphone would produce a voltage as the result of the external amplitude displacement that accompanied the compression wave as it traveled down the coupling member. If, therefore, progressive and repetitive elastic waves traverse a coupling member, as is the case when ultrasonic waves are moving along such a coupler, and if *all* of this energy were absorbed from the end of the coupling member opposite the end where the energy was introduced, the microphone would respond to a series of amplitude peaks one behind the other which moved at the speed of sound in that material.

Figure 6:
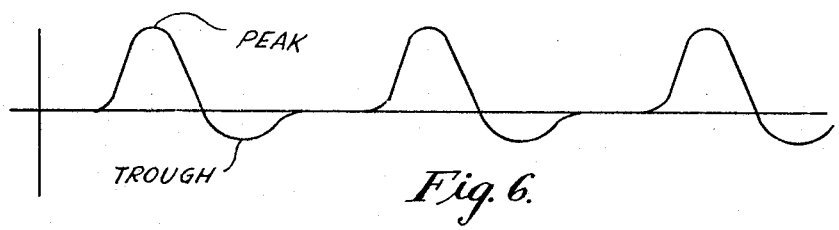
FIGURE 6 is a graph of repetitive elastic waves when all of the energy is absorbed from the end of a coupler.

As a result of the passage of any compression wave, there is a trough as shown in FIGURE 6 behind the amplitude peak which results from the elastic inertia, and this trough will account for the fact that the microphone sees first an amplitude peak and then a depressed trough, so that in the example of continuous waves the voltage seen by the microphone does, in fact, oscillate above and below the zero voltage line.

As aforesaid, the above situation prevails only when all of the power is absorbed from the end of the coupling member. Under almost all ordinary circumstances, it is not possible, for various reasons not especially significant to this discussion, for all of the power to be absorbed from the end of the coupler. A portion of the elastic wave is reflected from the point where some of it radiated and progresses back toward the source of vibration.

Figure 6A:
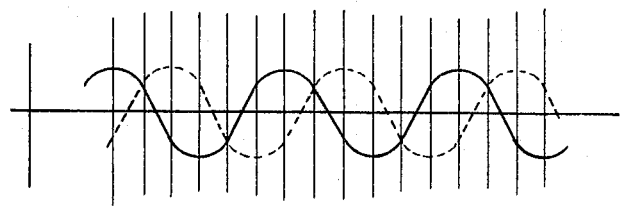
FIGURE 6a is a graph of repetitive elastic waves when only a portion of the energy is absorbed from the end of a coupler and the remaining portion is reflected back along the member.
Figure 7:
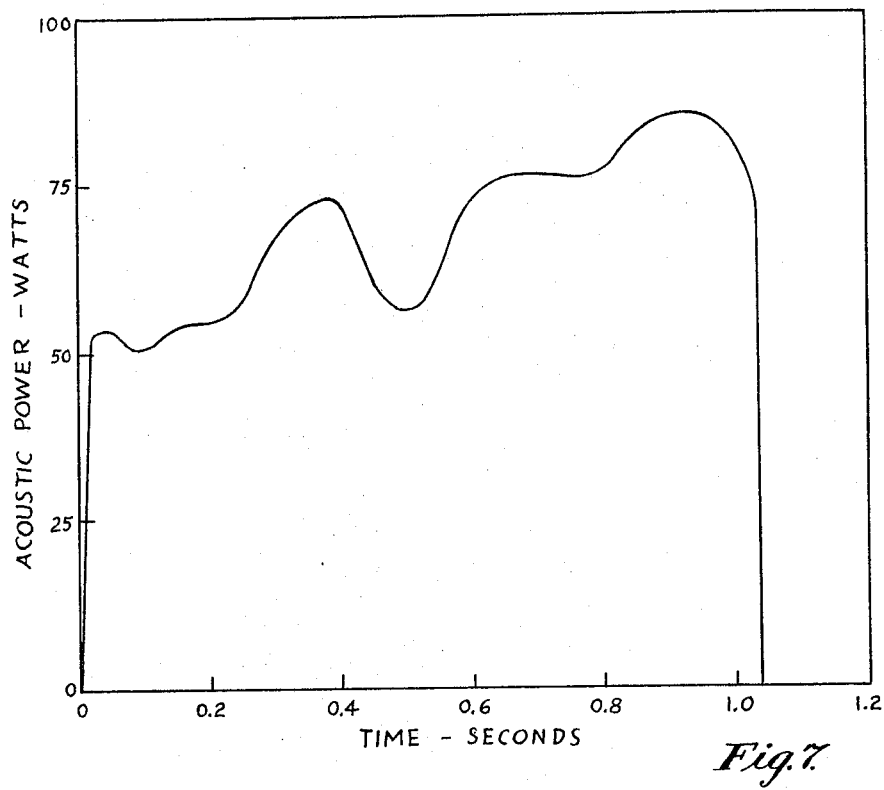
FIGURE 7 is a graph of acoustic power in watts versus time in seconds.

In FIGURE 6a, to illustrate the situation, there is plotted a condition wherein a portion of the energy is reflected back and the remainder of the energy is radiated. Now we see in the coupling member two sets of waves. The first set in solid lines represents the energy proceeding down the coupling member toward the area where it might be radiated. The second set of waves in dotted lines is that which results from the repetitive reflection of each wave portion that fails to be radiated out of the coupling member.

It is apparent that we now have a condition of standing waves in the coupling member; i.e., locales where the amplitude component of the reflected wave passes and reinforces the amplitude component of the progressive wave, and locales one-quarter wavelength apart from the former where the reflected wave in effect cancels out some of the amplitude of the proceeding wave. Similar conditions could be illustrated, as for example, when different portions of the energy are radiated out of the bar and different remainders are reflected.

From the foregoing, it will be apparent that microphones attached to the coupling bar at suitable intervals one-quarter wavelength apart can "see" the wave that is proceeding and the wave that is reflecting and moving back up the coupling bar toward the source.

A small electromechanical transducer, as for example a barium titanate ceramic wafer, firmly attached at a point on a structural member, will produce an alternating electrical signal proportional to the alternating mechanical displacement of a particle at the point of attachment. These elements are acceleration-sensitive, and the mechanical acceleration is 180 degrees out of phase with the displacement.

In the following analysis, it will be assumed that the electrical signal is numerically equal to the displacement with which it is associated, a result that could if necessary be produced by appropriate amplification or attenuation and/or shift of phase.

In this analysis, the following terms have the meanings indicated:

$\xi$ = instantaneous longitudinal displacement of a particle, a function of both time and position along the transmitting or coupling bar
$\xi_+$ = amplitude of a wave traveling toward the load
$\xi_-$ = amplitude of a reflected wave traveling back toward the transducer
$\omega$ = angular frequency
$t$ = time
$K$ = wave number = $2\pi/\lambda$
$\chi$ = position along the bar
$Z_c$ = acoustic impedance which characterizes the transmitting or coupling bar
$\lambda$ = wavelength of the sound waves in the bar
$\xi_{max}$ = maximum particle displacement
$\xi_{min}$ = minimum particle displacement
$i$ = square root of minus one (electricity)
$\delta$ = distance between transducers
$Z_t$ = acoustic impedance terminating or attached to the coupler bar The mechanical displacements along a structural member or bar that is transmitting acoustical power may be described by the equation:

(1) $\quad \xi = \xi_+ \cos(\omega t - K\chi) + \xi_- \cos(\omega t - K\chi)$

Equation 1 refers of course to a single frequency ($f = \omega/2\pi$), and represents the superposition of two sets of waves traveling in the directions of ($+\chi$) and ($-\chi$) respectively. If waves of more than one frequency are present, Equation 1 may be extended to include as many additional pairs of terms as may be necessary.

It may easily be shown, and is well known to those versed in the art of acoustical engineering, that the average power $\overline{P}$ transmitted along the structural member is:

(2) $\quad \overline{P} = \frac{1}{2} Z_c \omega^2 (\xi_+^2 - \xi_-^2)$ where $Z_c$ is the characteristic acoustic impedance of the member. Thus, assuming $Z_c$ and $\omega$ to be known, average power may be computed after experimental determination of $\xi_+$ and $\xi_-$. The present invention accomplishes this determination in two different ways. The first scheme, FIGURE 1, consists of a series of several electromechanical transducers, or pickups, closely spaced along the structural member. Each of these pickups determines the amplitude of the mechanical displacement of the particle to which it is attached, and as will be shown, this permits determination of $\xi_+$ and $\xi_-$. The second scheme, FIGURE 2, requires only two pickups (though more can be used to advantage in certain cases), which determine amplitude and relative phase of two neighboring points of the bar. Again the observed data permit determination of $\xi_+$ and $\xi_-$.

Equation 1 describes a standing wave pattern. Each particle of the structural member executes simple harmonic motion, but with amplitudes and phases that vary from point to point. Note that:

(3) at $K\chi = 0$, $\xi = (\xi_+ + \xi_-) \cos \omega t = \xi_{max} \cos \omega t$
at $K\chi = \pi/2$, $\xi = (\xi_+ - \xi_-) \sin \omega t = \xi_{min} \sin \omega t$ where $\xi_{max}$ and $\xi_{min}$ are respectively the maximum and minimum displacements in the standing wave patterns. In general, the origin of the coordinate system that specifies position $\chi$ along the bar is not known; furthermore, the appropriate origin may shift under different conditions of operation. But if a large number of observations are made simultaneously at points closely spaced along the bar, $\xi_{max}$ and $\xi_{min}$ can be directly determined. It can be shown that:

(4) $\quad \xi_{max} = \xi_+ + \xi_-$
$\xi_{min} = \xi_+ - \xi_-$

Hence, these data suffice to determine $\xi_+$ and $\xi_-$ separately, and hence $\overline{P}$ can be determined through Equation 2.

These considerations form the basis for the apparatus described in FIGURE 1.

Consider now the problem of determining $\xi_+$ and $\xi_-$ from two pickups, arbitrarily located along the bar. The displacements at these points, as indicated by Equation 1, will be:

(5) $\quad \xi_1 = \xi_+ \cos(\omega t - K\chi_1) + \xi_- \cos(\omega t + K\chi_1)$
$\xi_2 = \xi_+ \cos(\omega t - K\chi_2) + \xi_- \cos(\omega t + K\chi_2)$ The electromechanical transducers located at $\chi_1$ and $\chi_2$ respectively can be used to produce horizontal and vertical deflections on an oscilloscope. Let the horizontal deflection be equal numerically to $\xi_1$, the vertical to $\xi_2$. Since $\xi_1$ and $\xi_2$ differ in both phase and amplitude, though not in frequency, the oscilloscope will produce an ellipse. This observed ellipse is completely specified in terms of its semi-axes A and B, and the angle $\theta$ between the A-axis and the horizontal. In practice, it is convenient to choose the separation between the pickups so that $$K(\chi_2 - \chi_1) = \pi/2$$

In this case one finds, as will presently be proved:

(6) $\quad \xi_{max} = A; \quad \xi_{min} = B; \quad K\chi_1 = -\theta$

The area of this ellipse is proportional to the transmitted power, for:

(7) $\quad \text{AREA} = \pi AB = \pi \xi_{max} \xi_{min} = \pi (\xi_+^2 - \xi_-^2)$ If the separation of the transducers is such that $$K(\chi_2 - \chi_1) = \delta$$

one finds that:

(8) $\quad AB = (\xi_+^2 + \xi_-^2) \sin \delta$

Proof of Equations 6 and 8 is most readily accomplished by the use of complex algebra. Let the complex number $$Z' = U' + iv'$$

represent a point on the face of the oscilloscope. It will prove convenient to simplify our treatment by choosing time and length units so that the numerical values of $\omega$ and $K$ (Equations 5) are $\omega = K = 1$. In this case, any ellipse on the face of the oscilloscope may be described in terms of the parametric equations:

(9) $\quad u' = A \cos t'$
$v' = B \sin t'$

These equations may be more conveniently treated by writing the trigonometric functions in exponential form. When this is done, the parametric equation of the ellipse may be written:

(10) $\quad Z' = u' + iv' = \frac{1}{2}(A+B)e^{it'} + \frac{1}{2}(A-B)e^{-it'}$

This same ellipse can be described in terms of a horizontal axis system, whose $u$-axis makes an angle $\theta$ with the $u'$-axis. Then, setting $Z = u + iv$, we may write:

(11) $\quad Z = Z'e^{i\theta}$

The parametric equation of the ellipse in Equation 10 then becomes:

(12) $\quad Z = \frac{1}{2}(A+B)e^{i\theta}e^{it'} + \frac{1}{2}(A-B)e^{i\theta}e^{-it'}$ If we now change the origin of time so that $t' = t - \phi$, we may write:

(13) $\quad Z = \frac{1}{2}(A+B)e^{i(\theta-\phi)}e^{it} + \frac{1}{2}(A-B)e^{i(\theta+\phi)}e^{-it}$ This, then, is the equation of an ellipse whose A-axis makes an angle $\theta$ with the horizontal, $\theta$ measured positive counterclockwise from the horizontal.

The device that we are considering produces deflections on the face of the oscilloscope that are specified by Equations 5. From those equations, setting $\omega = K = 1$, one finds:

(14) $\quad u = \xi_+ \cos(t - \chi_1) + \xi_- \cos(t + \chi_1)$
$v = \xi_+ \cos(t - \chi_2) + \xi_- \cos(t + \chi_2)$ Next substitute exponentials for these trigonometric functions, and then substitute Equations 14 into $Z=u+iv$, obtaining:

(15) $Z=\frac{1}{2}(\xi_+e^{-i\chi_1}+\xi_-e^{i\chi_1}+i\xi_+e^{-i\chi_2}+i\xi_-e^{i\chi_2})e^{it}$
$+\frac{1}{2}(\xi_+e^{i\chi_1}+\xi_-e^{-i\chi_1}+i\xi_+e^{i\chi_2}+i\xi_-e^{-i\chi_2})e^{-it}$ Now define:

(16) $\chi_0=\frac{1}{2}(\chi_1+\chi_2);\ \delta=\chi_2-\chi_1$

Comparison of Equation 13 with Equation 15 yields values for $(A+B)$ and $(A-B)$. Straightforward but tedious algebraic manipulation yields:

(17) $AB=(\xi_+^2-\xi_-^2)\sin\delta$ and also

(18)
$$\xi_+^2=\frac{A^2+B^2+2AB\sin\delta-(A^2-B^2)\sin 2\theta\cos\delta}{4\sin^2\delta}$$
$$\xi_-^2=\frac{A^2+B^2-2AB\sin\delta-(A^2+B^2)\sin 2\theta\cos\delta}{4\sin^2\delta}$$

(19) $\tan 2\chi_0=\dfrac{(A^2-B^2)\cos 2\theta\sin\delta}{(A^2-B^2)\sin 2\theta-(A^2+B^2)\cos\delta}$ Note that $\delta$ is known, since it is defined in terms of the separation of the transducers in Equation 16. Note further that all the parameters on the right sides of Equation 18 and 19 can be determined by examination of the pattern on the face of the oscilloscope. All the parameters that specify the standing wave pattern in Equation 1 can thus be determined, including the value of $\chi_0$, which locates the origin of the coordinate system used for $\chi$ in Equation 1.

The advantages of a device designed to make $\delta=\pi/2$ will now be clear, for in this case Equations 18 and 19 lead directly to Equations 6.

The foregoing analysis demonstrates the possibility of obtaining complete information about the standing wave pattern from two arbitrarily spaced transducers. It will be clear to one versed in the art of electrical and/or acoustical measurements that the same information can be obtained from the two transducers by means other than the oscilloscope. Consider, for example, electrical signals equal numerically to $\xi_1$ and $\xi_2$ as specified in Equations 5. Let $\delta=K(\chi_2-\chi_1)$ (just as in Equation 16 except that the convenience of setting $K=\omega=1$ is no longer important). Then:

(20) $\xi_1=\xi_+\cos(\omega t-K\chi_1)+\xi_-\cos(\omega t+K\chi_1)$
$\xi_2=\xi_+\cos(\omega t-K\chi_1-\delta)+\xi_-\cos(\omega t+K\chi_1+\delta)$ Let the phase of $\xi_1$ be shifted by one network through an angle $(+\delta)$, and by a second through an angle $(-\delta)$. The transformed signals will be:

(21) $\xi_{1'}=\xi_+\cos(\omega t-K\chi_1+\delta)+\xi_-\cos(\omega t+K\chi_1+\delta)$
$\xi_{1''}=\xi_+\cos(\omega t-K\chi_1-\delta)+\xi_-\cos(\omega t+K\chi_1-\delta)$ Through the use of networks familiar to the art of electrical and/or acoustical engineering, one next forms electrical signals $\xi_2-\xi_{1'}$ and $\xi_2-\xi_{1''}$ respectively, viz.:

(22) $\xi_2-\xi_{1'}=2\sin\delta\xi_+\sin(\omega t-K\chi_1)$
$\xi_2-\xi_{1''}=-2\sin\delta\xi_-\sin(\omega t+K\chi_1)$ Thus $\xi_+$ and $\xi_-$ can be found by measuring the amplitudes specified in Equation 22, and $\chi_1$ can be found by measuring the difference in phase between the two signals.

Again, an electronic wattmeter can be used to determine the acoustic power, provided it is supplied with signals suitably derived from $\xi_1$ and $\xi_2$. Such wattmeters are designed to operate as follows: Let $e_1$ be a sinusoidal voltage developed *across* a two-terminal electrical impedance, and let $e_2$ be a sinusoidal voltage proportional to the current *through* that impedance. Then the average power delivered to that impedance is:

(23) $\overline{P}=C\overline{e_1e_2}$ where $C$ is a constant of proportionality, and $\overline{e_1e_2}$ is the time averaged value of the product. The design of the wattmeter per se is unimportant, it suffices that it read correctly, regardless of the phase difference between $e_1$ and $e_2$. Now let us supply the wattmeter with signals:

(24) $e_1=2\xi_2-(\xi_{1'}+\xi_{1''})$
$e_2=\xi_{1''}-\xi_{1'}$

These signals are respectively:

(25) $e_1=2\sin\delta(\xi_+\sin(\omega t-K\chi_1)-\xi_-\sin(\omega t+K\chi_1)$
$e_2=2\sin\delta(\xi_+\sin(\omega t-K\chi_1)+\xi_-\sin(\omega t+K\chi_1)$ The time average of the product of Equations 25 is:

(26) $\overline{e_1e_2}=\sin^2\delta(\xi_+^2-\xi_-^2)$

Hence the reading of the wattmeter is:

(27) $\overline{P}=C\sin^2\delta(\xi_+^2-\xi_-^2)$ which is clearly proportional to the average power transmitted acoustically, as specified in Equation 2.

While the above is specifically for longitudinal vibrations, on a uniform slender rod of less than one-quarter wavelength diameter, it may be applied in connection with any vibrational mode, as for example torsional vibrations, provided the measurements are related to the appropriate particle motions, as will be appreciated by one skilled in the art. While the present invention is most suitable for use with a uniformly cross-sectioned coupler, it will be apparent to persons skilled in the art that proper calibration will make it practical for use on an exponential-type or taper-type coupler.

FIGURE 1 shows a schematic view of apparatus for determining the standing wave pattern in a bar 1 capable of transmitting acoustic power. Transducers 2–18 are fixed to the bar 1 at spaced points therealong. The acoustic vibrations whereby power is transmitted may be longitudinal, torsional, transverse, or other, but whatever the mode of vibration, each of the transducers 2 to 18 must be capable of producing an electrical signal proportional to $\xi$, the instantaneous displacement of the particle to which it is attached. Since for simple harmonic oscillations at a specified frequency, $\xi$ is proportional to the particle velocity $\xi'$ and to the particle acceleration $\xi''$, it is clear that the electrical signal may be initiated by transducers sensitive to either of these latter quantities, or to any linear combination of $\xi$, $\xi'$ and $\xi''$.

The meters 19 to 35 connected to the transducers in FIGURE 1 merely symbolize electrical equipment capable of registering separately the electrical outputs of the various transducers. In practice, these are replaced by a single recording device, as for example an oscillograph, which by means of a standard sweep switch circuit array, automatically selects and records the various outputs in rapid succession. A graph-delineating meter reading as a function of position along the bar 1 permits determination of $\xi_{max}$ and $\xi_{min}$, the respective maximum and minimum amplitudes of particle displacement along the bar.

From these amplitudes, after calibration of the various components, one may determine the average power $\overline{P}$ transmitted along the bar by use of Equations 2 and 4.

Figure 2:
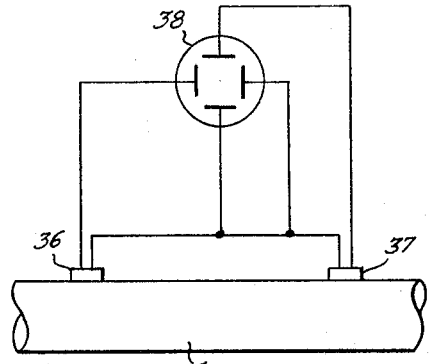
FIGURE 2 shows a schematic view of the apparatus for determining maximum instantaneous particle displacement, minimum instantaneous particle displacement, and a maximum and minimum in the standing wave pattern.

FIGURE 2 shows a device for determining $\xi_{max}$, $\xi_{min}$ and $\chi_1$ from Equations 6. Note that the position $\chi_1=0$ corresponds to a maximum in the standing wave pattern (cf. Equation 5), so that this device yields all the information obtainable from the device of FIGURE 1.

In FIGURE 2, transducers 36 and 37 having identical characteristics are spaced one-quarter wavelength apart and are fixed to bar 1. The transducer 36 is connected to one of the horizontal deflection plates of oscilloscope 38. The transducer 37 is connected to one of the vertical deflection plates of oscilloscope 38. The other vertical and horizontal deflection plates are connected to a wire extending between the transducers 36 and 37.

The purpose of the oscilloscope 38 will be clear from Equations 6 and Equation 7. Note that if the spacing between transducers is not one-quarter wavelength, the pattern on the oscilloscope can still be interpreted by Equations 18 and 19. Note further that Equations 18 and 19 permit one to calculate the error introduced if the separation between transducers 36 and 37 is slightly different from one-quarter wavelength, as for example when the device is used slightly off the design frequency.

Figure 3:
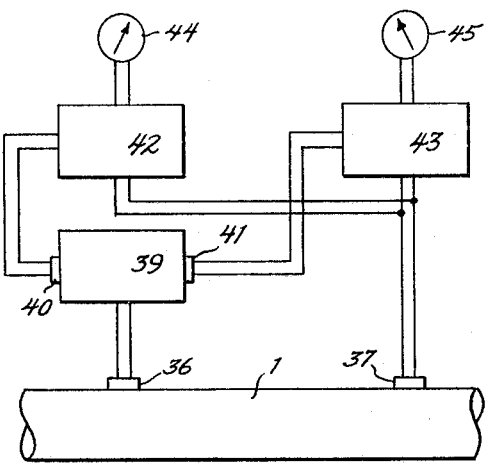
FIGURE 3 shows a schematic view of the apparatus for determining, in connection with two sets of waves traveling in opposite directions, the instantaneous particle displacement in each direction.

FIGURE 3 shows a schematic arrangement for determining $\xi_+$ and $\xi_-$ through the use of Equation 22. The transducer 36 is connected to a network shown schematically as 39. Network 39 shifts the phase of the electrical signal received from the transducer 36, and produces signals at the output terminals 40 and 41 that respectively lead and lag the input by an amount $\delta$, so that the outputs are $\xi_{1'}$ and $\xi_{2''}$, as specified by Equation 21.

A computer device 42 is connected to the transducer 37 and the output terminal 40. A computer device 43 is connected to the transducer 37 and the output terminal 41. The devices 41 and 43 compute the differences between signals received from two sources, and register these differences on the meters 44 and 45. Th network 39 and the computer devices 42 and 43 are, per se, well known to the art of electrical engineering. It will be clear that the indications of the meters 44 and 45 are respectively proportional to the amplitudes of the right hand members of Equation 22, so that if sin $\delta$ be known (from the spacing of the transducers 36 and 37, cf. Equation 16) $\xi_+$ and $\xi_-$ can at once be calculated.

Figure 4:
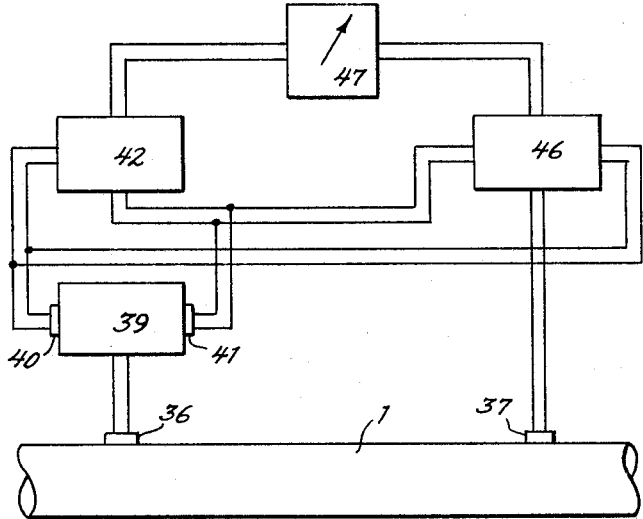
FIGURE 4 shows a schematic view of the apparatus for utilizing an electrical wattmeter to read the acoustic power transmitted along a bar capable of transmitting acoustic power.

FIGURE 4 represents an arrangement for utilizing an electrical wattmeter 47 to read the acoustic power transmitted along the bar 1. In this arrangement, network 39 and computer device 42 perform the same functions that they do in FIGURE 3, but they are now used to form the signal required by the second of Equations 25.

The computer device 42 is connected to the output terminals 40 and 41. A computer device 46, for forming the signal required by the first of Equations 25, is connected to the output terminals 40 and 41 as well as to the transducer 37. The wattmeter 47 is connected to the output of the computer devices 42 and 46.

As has been indicated, for the practice of this invention, sensing elements (herein described as transducers or microphones or pickups) are necessary which are capable of detecting and transducing to an electrical signal at the system resonant frequency either a stress or a strain in any direction which is proportional to a stress or strain associated with the direction of wave propagation.

Satisfactory sensing elements may comprise, for example, barium titanate crystals (½-inch by 0.012-inch by ⅛-inch) to which are attached two brass or gold connector strips 0.001-inch thick by 3/32-inch wide by 1½-inches long, the connector strips being attached uniformly along the entire face of the ceramic element (barium titanate crystal).

When two crystals are used, they may be placed one-quarter wavelength apart and preferably perpendicular to the axis of the coupler so as to detect the associated motion over a minimal wavelength.

The sensing elements may be adhesively attached to the coupler, as with epoxy resin, and for purposes of protection they may be covered with plastic electrical tape.

When using the present invention in connection with an oscilloscope in connection with laboratory work, it may be desirable to have a motion picture camera (speed at least 32 frames per second) to photograph the Lissajou figure in the oscilloscope resulting when signals from two sensing elements one-quarter wavelength apart are amplified and displayed by the horizontal and vertical electron beams.

In addition, when an oscilloscope is used in practicing the present invention, amplifying equipment will be necessary to amplify the signals from the sensing elements sufficiently to permit their observation on a standard oscilloscope.

Once the sensing elements (transducers, crystals, microphones, pickups) are mounted on the coupler, the electrical analog of the stress or strain will always be present during the transmission of vibratory energy.

Each of the crystals has two leads attached (one+ and one−) which serve to carry the analog voltage to the instruments. The wires from the crystals are attached to the oscilloscope and the motion picture camera is properly positioned and focused on the oscilloscope. The electron beam (spot on the oscilloscope) is set to a predetermined intensity level to facilitate photography, and photography is begun just prior to applying ultrasonic energy to the ultrasonic transducer which is attached to the coupler; photography is continued to just past the end of the time cycle. All pertinent data is obtained during this period.

Figure 5:
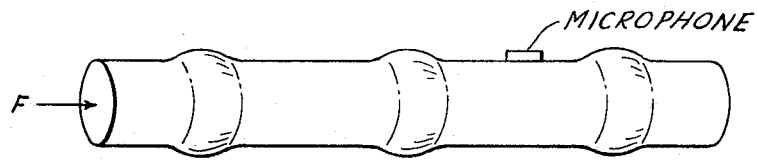
FIGURE 5 is a magnified illustration of a compression wave progressing along a member.

Reduction of the photographic record to power delivery measurements is as follows: The 16 mm. film is processed, after which the traces on the individual frames are projected onto a screen and the area is determined by traversing the perimeter with a planimeter. By a previous calibration for the system and the knowledge of the gain (amplification) setting on the oscilloscope, it is possible to determine the actual mechanical power level associated with each frame on the film. Each frame also represents a particular very short time interval during the observed time cycle; this is ascertained from the number of film frames per observation cycle. The data can then be plotted (power level vs. time); a sample curve is shown in FIGURE 5. The energy delivered during the observed time interval is proportional to the area encompassed by this curve.

Much of the above tedious work may be eliminated by reducing the data to useful form by programming it and putting it through a computer.

Figure 8:
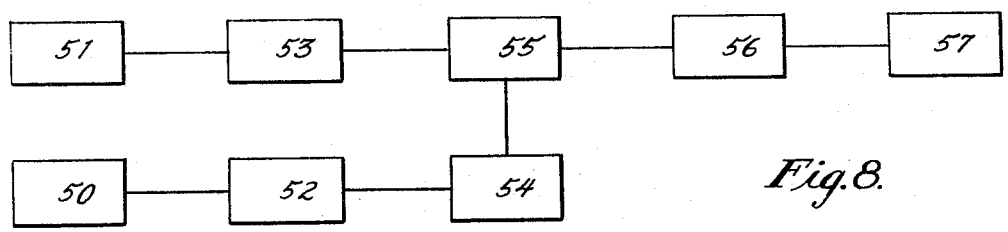
FIGURE 8 is a block diagram of a direct indicating acoustic power measuring instrumentation.

It is possible to eliminate the photographic step by an arrangement of apparatus as shown in FIGURE 8. The signal from pickup 50 is fed through a decoupling cathode follower 52 to a phase-shifting network 54. The signal from pickup 51 is fed through a decoupling cathode follower 53. The signals from pickups 50 and 51 are initially displaced ninety degrees in time and the network 54 shifts the signal from pickup 50 ninety degrees to zero. The two signals are then fed into a standard VAW Meter 55 such as VAW Meter Model 102, John Fluke Mfg. Co. which has a frequency response up to twenty kilocycles per second.

After appropriate calibration, the VAW Meter will indicate the power level (RMS) directly. Rapid response, up to 100 cycles per second, can be obtained by picking off the ($w$) signal from the meter circuit and applying this signal through a D.C. amplifier 56 to a strip chart recorder 57 such as a Brush or Sanborn oscillograph.

As is well known, power is dependent on amplitude whereas impedance is independent of amplitude. Therefore, in utilizing the present invention for determining the acoustic impedance of an ultrasonic transducer-coupling system's terminal load, given the standing wave ratio (as determined by means of the present invention) and the distance $x_0$ (note that it is the position of maximum amplitude and not the amplitude measurement which is involved) from the end of the coupler to the nearest amplitude maximum in the standing wave pattern (also using the present invention), the teminal impedance can be computed using the equation:

$$(28) \quad \frac{Zt}{Zc} = \frac{\xi_{min} \cos \frac{2\pi}{\lambda} x_0 - J\xi_{max} \sin \frac{2\pi}{\lambda} x_0}{\xi_{max} \cos \frac{2\pi}{\lambda} x_0 - J\xi_{min} \sin \frac{2\pi}{\lambda} x_0}$$

Equation 28, as a formula per se, may be found in standard treatises on electrical transmission line theory. The calculation is most easily carried out using the so-called "Transmission Line Calculator" devised by P. H. Smith and described in the magazine Electronics in January 1939 and January 1944 issues.

In using the present invention for maintaining precise tuning of an ultrasonic system, as in cases requiring maximum performance efficiency of the equipment, the sensing element-amplifier-oscilloscope concept may be used, instead of photographic equipment or elaborate calculations. Thus, visual observation of the oscilloscope trace to note any change in size of the ellipse will indicate when adjustments must be made to the power source or other equipment parts, so that maximum ellipse area will be maintained—because maximum ellipse area is the area at which maximum power is being delivered. Reductions in ellipse area may be occasioned by loosened or cracked joints in the system, changes in the work area, etc., which may be remedied or for which adjustments may be made in ways well known to those skilled in the art.

The present invention may be used to determine the amount of acoustical power being transmitted to metal members being ultrasonically welded. Apparatus for effecting ultrasonic welding is disclosed in Patent 2,946,119 and the disclosure thereof is incorporated herein. In such an apparatus, bar 1 would represent the coupler bar of the ultrasonic welding apparatus.

Investigations were made using the apparatus set forth in said patent and with four different materials: .032 inch 1100–H14 aluminum, 0.32 inch 2024–T3 Alclad aluminum alloy, 0.32 inch commercially pure copper, and .028 inch Armco iron. Using a three inch radius spherical tip and a flat-faced anvil, welds were produced in each material at each of two power levels, 800 and 1600 watts, at clamping forces of 250 and 750 pounds. Polaroid photographs of the oscilloscope traces were taken prior to initiation of the first weld, at the middle of the second weld, and near the completion of the third weld.

The delivery of acoustical energy was strongly influenced by the clamping force. For aluminum, the highest efficiencies were obtained at the higher clamping force. For ingot iron, the higher efficiencies were obtained at the lower clamping forces. The applicants are unable to explain the latter result. However, in general, consistent high quality welds are obtained when the standing wave ratios were lowest and the clamping forces were highest. When these circumstances are present, the ellipse areas are much higher than when low quality welds are being produced. The present invention enables these factors to be recorded and observed so that operations may be terminated when poor quality welds are being obtained. Thus, it is possible to monitor weld quality during the welding process and thereby eliminate the necessity for separate remote destructive or non-destructive tests conventionally used for ascertaining weld quality.

It is to be emphasized that the present invention may be utilized, not only with ultrasonic welding transducer-coupling system, but generally in any application of ultrasonics involving the transmission of acoustical power along an acoustical conductor.

The present invention may be embodied in other specific forms without departing from the spirit or essential attributes thereof and, accordingly, reference should be made to the appended claims, rather than to the foregoing specification as indicating the scope of the invention.

It is claimed:
1. A device for measuring acoustic power comprising a metallic structural member for transmitting acoustical power, means for ascertaining instantaneous particle displacement in said member, said means including two transducers fixed to said member at known fixed points for producing electrical signals proportional to the instantaneous displacements of the particles to which they are attached, an electrical network connected to the output of one of said transducers for shifting the phase of the electrical output of said one transducer by a predetermined amount, and means connected to the output of said network and to the unaltered output of the other transducer for comparing and indicating the composite electromotive forces as a function of acoustic power.

2. A device for measuring acoustic power comprising a structural member for transmitting acoustical power, means for ascertaining instantaneous particle displacement in said member, said means including two transducers fixed to said member at known fixed points which are spaced apart by a known fraction of a wavelength, said transducers being capable of producing electrical signals proportional to the instantaneous displacements of the particles to which they are attached, an electrical network connected to the output of one of said transducers for shifting the phase of the signal from said one transducer so as to produce two signals which respectively lead and lag the signal from said one transducer by predetermined amounts, means connected to an output terminal of said network for indicating the unaltered output of said other transducer and comparing the signal which leads the signal from said one transducer, and means connected to another output terminal on said network for comparing the unaltered output of said other transducer and the signal which lags said one transducer signal.

3. A device for measuring acoustic power comprising a structural member for transmitting acoustic power and having known acoustic properties and mode of vibration, means for ascertaining instantaneous particle displacement in said member, said means including two transducers fixed to said member, said transducers being spaced apart by a known fraction of a wavelength, said transducers being capable of producing electrical signals proportional to the instantaneous displacements of the particles to which they are attached, an electrical network connected to the output signal of one of said transducers for shifting the phase of said one transducer signal so as to provide two signals which respectively lead and lag the one transducer signal by known amounts, a pair of computer devices each connected across the output terminals of said network, one of said devices being connected to the unaltered signal from said other transducer, and a means connected across said devices for indicating the acoustic power being transmitted by said member.

4. A device in accordance with claim 3 wherein said means for indicating the acoustic power being transmitted by said member is a wattmeter.

5. A device for measuring acoustic power comprising a metallic structural member for transmitting acoustic power and having a known mode of vibration, means for ascertaining instantaneous particle displacement in said member, said means including two transducers affixed to said member at points spaced apart a whole number multiple of one-quarter of a wavelength for producing electrical signals proportional to the instantaneous displacements of the particles to which they are attached, and means connected to said transducers for indicating directly the level of acoustic power being transmitted by said member.

6. A device in accordance with claim 5 wherein said means includes a strip chart recorder.

7. A device for measuring acoustic power comprising a metallic structural member for transmitting acoustic power and having a known mode of vibration, means for ascertaining instantaneous particle displacement in said member, said means including two transducers fixed to said member at spaced points, the distance between said spaced points corresponding to a known fraction of a wavelength for producing an electrical signal proportional to the instantaneous displacement of the particle to which it is attached, and means connected to said transducers for combining the output signals of said transducers so as to produce a resultant signal proportional to the parameter of the standing wave ratio of the acoustical power being transmitted by said member.

8. A device in accordance with claim 7 including an indicator connected to said means for permanently recording and indicating said resultant signal.

9. A method for determining the standing wave pattern in a vibratory member comprising the steps of attaching a plurality of transducers at spaced points along the length of a metallic structural member of known length, introducing vibratory energy into said member, measuring instantaneous particle displacement of said member by said transducers at said points, generating an output signal from each transducer indicative of the amount of particle displacements sensed by each transducer, and then combining the output signal of said transducers so as to produce a resultant signal proportional to the elastic standing wave parameter of the acoustical power being transmitted by said member.

10. A method in accordance with claim 9 including the step of spacing said points apart by a distance corresponding to a whole number multiple of one-quarter wavelength according to the properties and characteristics of the material of said structural member.

11. A method of measuring acoustic power being transmitted by a metallic structural member comprising the steps of attaching a plurality of transducers at spaced points along the length of a metallic structural member, introducing vibratory energy into said member, measuring the instantaneous particle displacement of said member by said transducers at said points, generating an output signal from each transducer indicative of the amount of particle displacement sensed by each transducer, shifting the phase of the output signal of one transducer by a known amount, combining the output signal of another transducer and the phase shifted signal of said one transducer so as to produce a resultant signal proportional to the parameter of the elastic standing wave ratio of the acoustical power being transmitted by said member.

12. A method in accordance with claim 11 including the step of spacing said points apart by a distance corresponding to a whole number multiple of one-quarter wavelength according to the properties and characteristics of the material of said structural member, and permanently recording said resultant signal.

13. A method in accordance with claim 11 including the step of effecting a weld between two members by the vibratory energy transmitted by said member, and effecting said weld while said elastic standing wave ratio is minimal.

14. A method for ascertaining the vibratory elastic stress standing wave ratio existing on an acoustical coupling member transmitting acoustical power comprising making simultaneous detections of instantaneous particle displacement of the material of said acoustical coupling member at points along the surface of said acoustical coupling member, said points being spaced apart at intervals of one-quarter of an acoustical wavelength in said coupling member, and combining said simultaneous detections so that the maximum amount of instantaneous particle displacement divided by the minimum amount of instantaneous particle displacement equals the vibratory elastic stress standing wave ratio.

15. A method for ascertaining the vibratory elastic stress standing wave ratio existing on a metallic acoustical coupling member transmitting acoustical power comprising simultaneously detecting instantaneous particle displacement at each of two points spaced apart one-quarter wavelength on the surface of an acoustical coupling member, generating signals indicative of said displacement at said points, applying one signal to the vertical deflection plate of an oscilloscope, applying the other signal to the horizontal deflection plate of an oscilloscope, generating a generally elliptical figure on the oscilloscope from said signals whereby the ratio of the major axis amount and the minor axis amount of said figure may be ascertained for computing the vibratory elastic stress standing wave ratio.

16. A method for ascertaining acoustical power being transmitted in an acoustical coupling member comprising simultaneously detecting instantaneous particle displacement at each of two points spaced apart one-quarter wavelength on the surface of an acoustical coupling member, generating signals indicative of said displacement at said points, applying one signal to the vertical deflection plate of an oscilloscope, applying the other signal to the horizontal deflection plate of an oscilloscope, generating a generally elliptical figure on the oscilloscope from said signals, measuring the area of said figure whereby the acoustical power being transmitted in said coupling member may be computed therefrom.

17. A method for ascertaining acoustical power being transmitted in an acoustical coupling member comprising simultaneously detecting instantaneous particle displacement at each of two points spaced apart one-quarter wavelength on the surface of an acoustical coupling member, generating signals indicative of said displacement at said points, shifting the phase of one signal 90 degrees with respect to the other signal, applying one signal to the vertical deflection plate of an oscilloscope, applying the other signal to the horizontal deflection plate of an oscilloscope, generating a generally elliptical figure on the oscilloscope from said signals, measuring the area of said figure whereby the acoustical power being transmitted in said coupling member may be computed therefrom.

18. An apparatus for measuring acoustical power comprising standing wave pattern means for ascertaining the elastic standing wave pattern in a metal structural member transmitting acoustical power, said standing wave pattern means including a plurality of transducers for coupling to the member at a predetermined distance apart from one another and for producing electrical signals proportional to the instantaneous displacements of particles of the member, and second means coupled to said standing wave pattern means for ascertaining the acoustical power being transmitted by the member from a parameter of the standing wave pattern ascertained by said standing wave pattern means.

19. A device in accordance with claim 18 wherein said transducers are barium titanate crystal wafers, said transducers having a mass that is relatively small compared to the mass of the structural member to which they are to be attached.

20. In apparatus in accordance with claim 18 wherein said last-mentioned means includes an oscilloscope having a horizontal deflection plate connected to one transducer and a vertical deflection plate connected to another transducer next adjacent to said one transducer, whereby a generally elliptical figure may be generated on said oscilloscope.

References Cited by the Examiner

UNITED STATES PATENTS

| | | | |
|---|---|---|---|
| 2,241,874 | 5/1941 | Zuschlag | 181—.5 |
| 2,280,226 | 4/1942 | Firestone | 181—.5 |
| 2,442,606 | 6/1948 | Korman | 324—84 |
| 2,562,281 | 7/1951 | Mumford | 324—58 |
| 2,605,323 | 7/1952 | Samuel | 324—58 |
| 2,675,086 | 4/1954 | Clewell | 181—.5 |
| 2,702,472 | 2/1955 | Rabinow. | |
| 2,834,422 | 5/1958 | Angona | 181—.5 |
| 2,837,914 | 6/1958 | Caldwell. | |
| 2,956,184 | 10/1960 | Pollack | 340—10 |
| 3,088,541 | 5/1963 | Alexander et al. | 181—.5 |

BENJAMIN A. BORCHELT, *Primary Examiner.*

CHARLES W. ROBINSON, CHESTER L. JUSTUS, SAMUEL FEINBERG, *Examiners.*

A. S. ALPERT, J. W. MILLS, M. F. HUBLER,
*Assistant Examiners.*